Jan. 6, 1953  J. C. SZYCHOWSKI ET AL  2,624,406
VEHICLE WINDSHIELD COVER
Filed Dec. 9, 1949
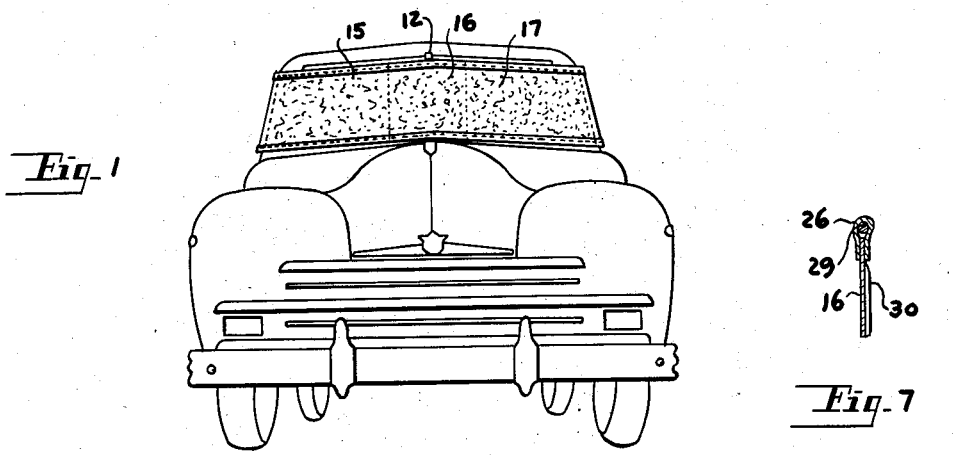
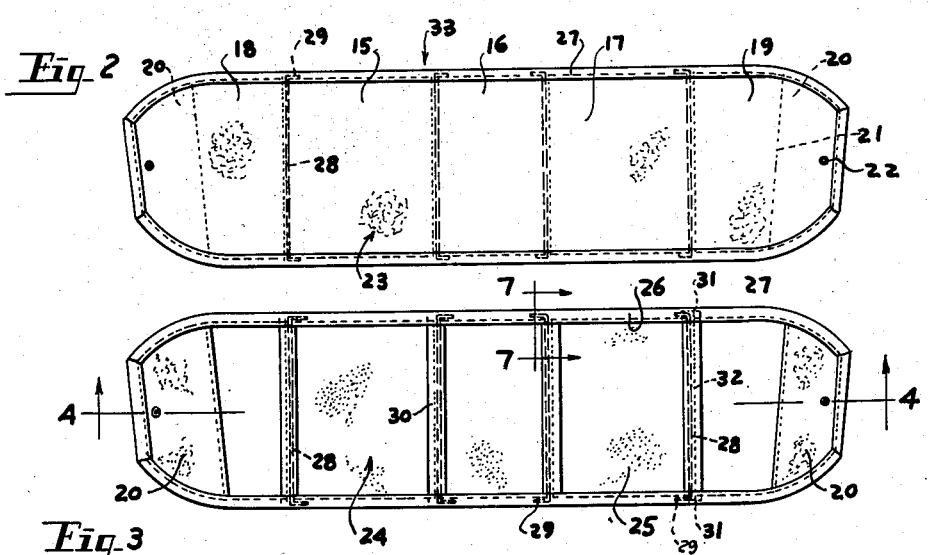
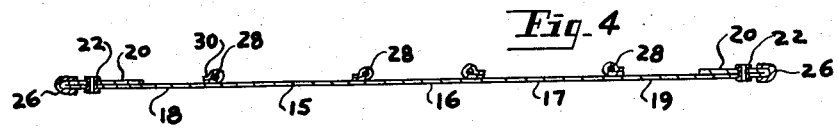
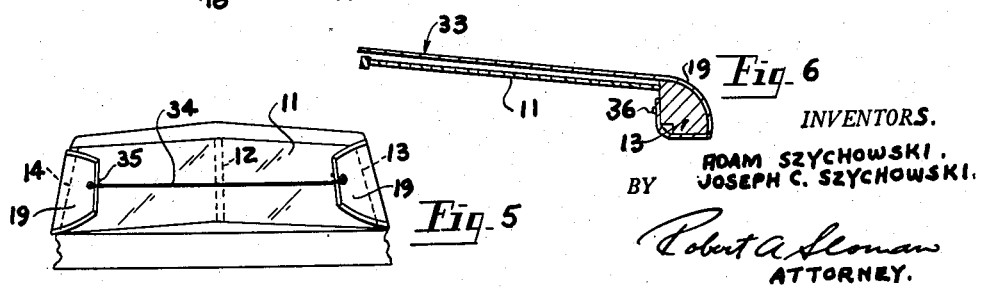
INVENTORS.
ADAM SZYCHOWSKI.
JOSEPH C. SZYCHOWSKI.
BY
Robert A. Sloman
ATTORNEY.

Patented Jan. 6, 1953

2,624,406

UNITED STATES PATENT OFFICE 2,624,406

VEHICLE WINDSHIELD COVER

Joseph C. Szychowski and Adam Szychowski, Detroit, Mich.

Application December 9, 1949, Serial No. 132,128

1 Claim. (Cl. 160—368)

This invention relates to a windshield cover and more particularly to a windshield cover adapted for use upon the outside of a windshield for protecting its outer surface from the formation of ice thereon during parking in the winter.

It is the object of the present invention to provide a windshield cover which includes a rectangularly shaped fabric element removably mountable upon the outside of a vehicle windshield, with the outer ends of said cover including tabs which are adapted to extend around the outer windshield frames and into the interior of the vehicle, with suitable means being provided for effectively securing said tabs therein.

These and other objects will be seen from the following specification and claim in conjunction with the appended drawing in which:

Fig. 1 is a front elevational view of a vehicle with the windshield cover secured upon its windshield;

Fig. 2 is a front elevational view of the windshield cover when unfolded;

Fig. 3 is a rear elevational view thereof;

Fig. 4 is a section on line 4—4 of Fig. 3;

Fig. 5 is a fragmentary elevational view from the interior of the vehicle looking towards the windshield;

Fig. 6 is a fragmentary plan section illustrating a slightly different method of securing one of the windshield cover tabs to the vehicle; and Fig. 7 is a fragmentary section on line 7—7 of Fig. 3.

It will be understood that the above drawing illustrates merely a preferred embodiment of the invention and that other embodiments are contemplated within the scope of the claim hereafter set out.

Referring to Fig. 5 of the drawing illustrating the interior side of the vehicle windshield 11, there is shown the central upright windshield frame element 12 and the spaced upright outer windshield frame elements 13 and 14.

The windshield cover adapted for mounting and securing over the windshield 11 is shown unfolded in Fig. 2 and includes the central sections 15, 16 and 17 and the securing tabs 18 and 19 at opposite ends thereof. The outer ends of the tabs 19 are reenforced by the portions 20 which initially form a part of said tabs but which are folded over as shown in Figs. 2 and 3 and secured to the rear portions of said tabs as by the seams 21.

Centrally positioned within each of the tabs 18 and 19, adjacent their outer ends are the circular fastening devices 22 by which the windshield cover may be secured relative to the windshield in the manner hereafter described.

The windshield cover including the sections 15, 16, 17, 18, 19 and 20 have a leatherette covering or outer surface which is flexible and substantially water repellant, being generally indicated by the numeral 23. And it is noted that this leatherette also extends over and throughout the inner portions 20 which form a part of the backing of the tabs 18 and 19, being the portion which would be visible from the interior of the vehicle as in Fig. 5.

The inner surface 24 Fig. 3 of the windshield cover is preferably coated by spraying or otherwise with a water repellant such as liquid petrolatum, and this is generally indicated at 25.

A suitable binding 26 is folded over the outer perimeter of the windshield cover as illustrated in Figs. 2, 3 and 4 and is secured to said windshield cover including the outside edge of the tabs 18 and 19 as by the continuous stitches 27, whereby an adequate reinforcement is provided for the raw edges of the fabric element 15, 16, 17, 18 and 19.

A plurality of upright parallel spaced reinforcing wires 28 are arranged upon the inner surface 24 of the windshield cover, the outer ends 29 of said wires being bent outwardly at right angles and lying adjacent the outer horizontal edges of the windshield cover and within the binding 26 as shown in Figs. 2 and 3. Upright parallel spaced strips of material 30 are centrally folded over the wire elements 28 and the free lateral edges of said material are secured to each other and to the rear surface 24 of the windshield cover by the upright stitches 32. The respective opposite ends 31 of the wire securing strips 30 project under the binding 26 and are further secured with respect to the windshield cover by the stitching 27.

It is noted that the outturned ends 29 of reinforcing wires 28 project beyond the longitudinal edge of the strips 30 so that said ends 29 are effectively secured within the binding 26 also by the stitching 27.

The windshield cover generally indicated in Figs. 2 and 6 by the numeral 33 is mounted upon the outer surface of the windshield 11, whereas the outer tabs 18 and 19 are folded around the outer frame elements 13 and 14 of the windshield, and project towards each other as shown in Fig. 5.

The strap 34 which is preferably elastic has hooks 35 at its outer ends adapted for retaining registry within the openings of the fasteners 22 to effectively maintain the windshield cover in its proper position relative to the windshield.

To remove the cover it is merely necessary to unhook one or both of the hooks 35 from the elastic, and upon removal of the cover the same may be folded and stored within the vehicle. While the elastic strap 34 is illustrated as a preferred means for securing the windshield cover it is contemplated that this may be done in other suitable manner such as by projecting the tabs 19 around the outer windshield posts 13, registering the hollow fasteners 22 over the outwardly projecting fastening elements 36 which are secured to frames 13 as shown in Fig. 6. This of course eliminates the elastic 34 and at the same time provides a satisfactory method of securing the windshield cover in proper position.

It is contemplated that the present windshield cover may also be mounted if desired upon the rear window of the vehicle to prevent the accumulation of ice thereon. In this case the method of fastening would preferably be similar to that shown in Fig. 6 but with the fasteners 36 projecting outwardly from the frame of said rear window.

In the preferred embodiment of the invention the windshield cover has an outer covering of leatherette which is preferable as the same is substantially water repellent and moderately low temperatures do not appear to cause any damage thereto. It is contemplated however that any other suitable material having such characteristics could also be used.

Having described our invention reference should now be had to the claim which follows for determining the scope thereof.

We claim:

In combination with a vehicle windshield having upright outer side frames, a windshield cover consisting of a flexible fabric element adapted for positioning upon the outside of said windshield, tabs at opposite ends of said element folded around said frames and immovably secured with respect thereto, a plurality of upright parallel longitudinally spaced throughout the length of said element reinforcing wires secured to said element upon its inner window engaging surface, the ends of said wires being bent at right angles adjacent the top and bottom longitudinal edges of said element, bearing against said inner surface of said element and in a plane parallel thereto, fabric strips folded over said wires with their free edges respectively secured to each other and to said inner surface of said element, the bent portions of said wires extending from said strips, and a U-shaped binding secured around the entire periphery of said element and tabs with the opposite ends of said strips, as well as the outturned portions of said wires being immovably secured within said binding.

JOSEPH C. SZYCHOWSKI.
ADAM SZYCHOWSKI.

REFERENCES CITED

The following references are of record in the file of this patent:

UNITED STATES PATENTS

| Number | Name | Date |
| --- | --- | --- |
| 699,513 | Garms | May 6, 1902 |
| 1,082,204 | Martin | Dec. 23, 1913 |
| 1,679,443 | Olsen | Aug. 7, 1928 |
| 2,065,242 | Omerly | Dec. 22, 1936 |
| 2,223,145 | Wise | Nov. 26, 1940 |
| 2,437,845 | Wyeth | Mar. 16, 1948 |